United States Patent

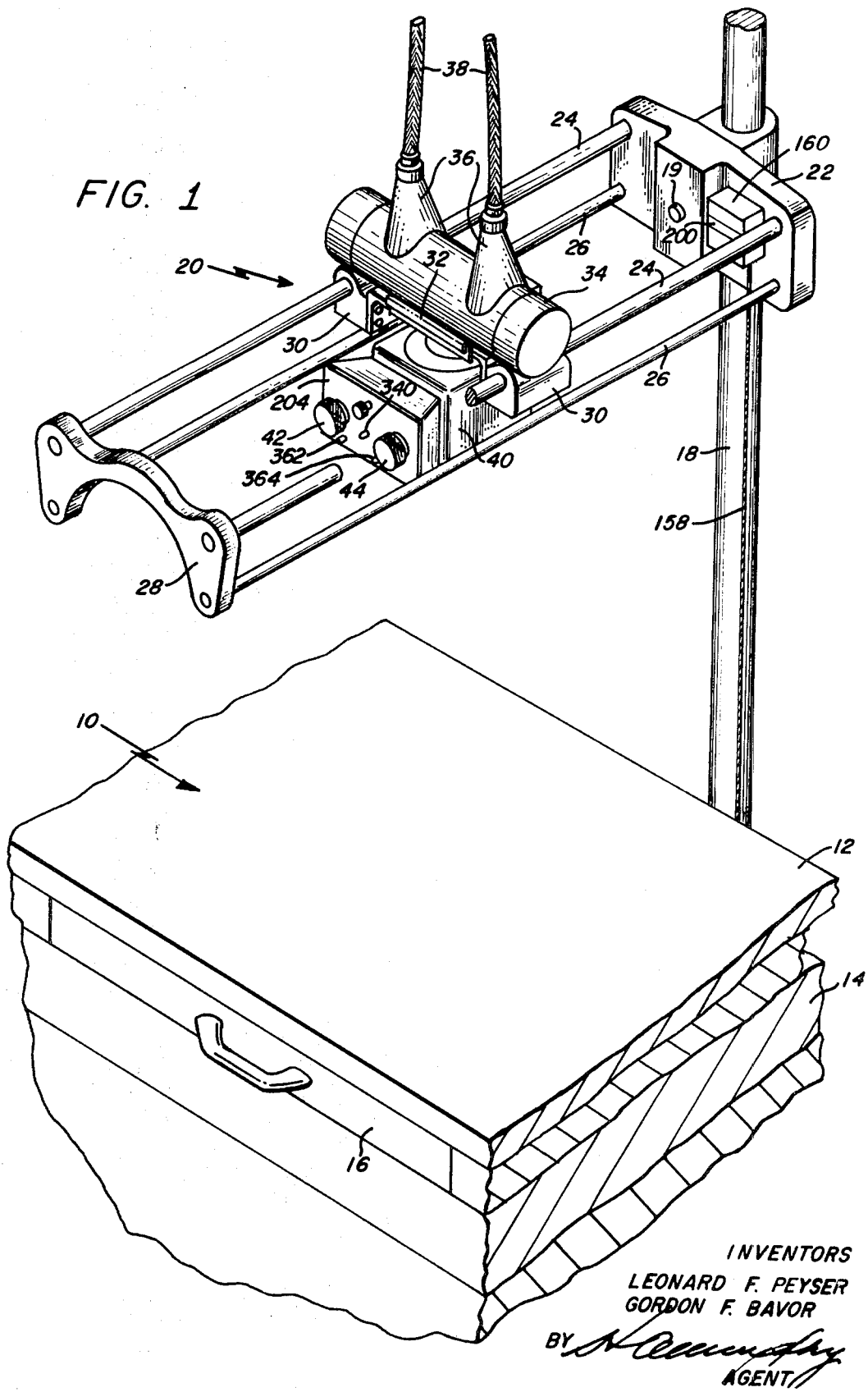

[11] 3,581,094

| | | |
|---|---|---|
| [72] | Inventors | Leonard F. Peyser<br>Briarcliff Manor, N.Y.;<br>Gordon F. Bavor, Norwalk, Conn. |
| [21] | Appl. No. | 774,106 |
| [22] | Filed | Nov. 7, 1968 |
| [45] | Patented | May 25, 1971 |
| [73] | Assignee | The Machlett Laboratories, Incorporated<br>Springdale, Conn. |

[54] X-RAY APPARATUS
10 Claims, 22 Drawing Figs.

[52] U.S. Cl. .................................................. 250/105,
 250/66
[51] Int. Cl. ..................................................... G03b 41/16
[50] Field of Search .......................................... 250/66, 105

[56] References Cited
UNITED STATES PATENTS

| | | | | |
|---|---|---|---|---|
| 2,921,202 | 1/1960 | Berger et al. .................. | | 250/105 |
| 3,130,313 | 4/1964 | Tilling .......................... | | 250/105 |
| 3,206,604 | 9/1965 | Burchell ....................... | | 250/105 |
| 3,502,878 | 3/1970 | Stewart et al. ................ | | 250/105 |

Primary Examiner—James W. Lawrence
Assistant Examiner—A. L. Birch
Attorney—Harold A. Murphy ABSTRACT: X-ray apparatus for preventing overexposure of a subject to X-radiation by limiting the size of the irradiated area to conform substantially to the size of any one of a number of predetermined selected film sizes. This is achieved by an electrical system for compiling and integrating information indicative of the longitudinal and lateral dimensions of the film area, the distance between the film and the X-ray tube, and the size of the cone of radiation as established by adjusted collimation of the X-ray beam. The electrical system functions to effectively permit operation of the X-ray tube when integrated information indicates that the various components of the apparatus are properly adjusted so that the size of the cone of radiation and, consequently, of the irradiated area conforms substantially to the size of a film being used.

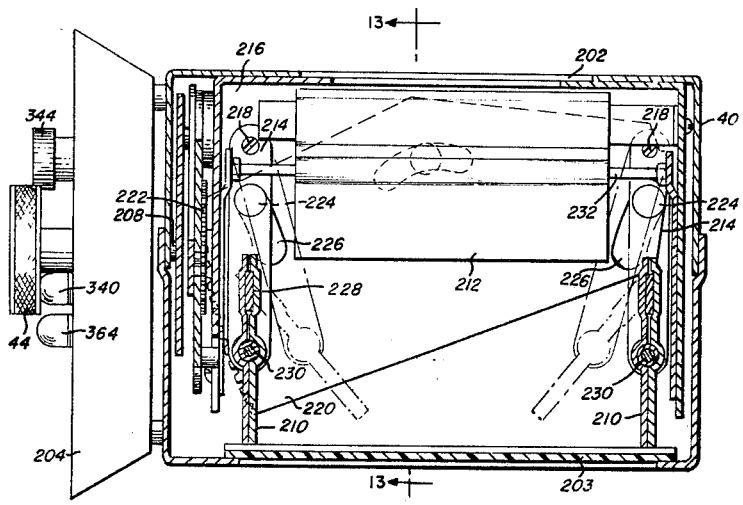

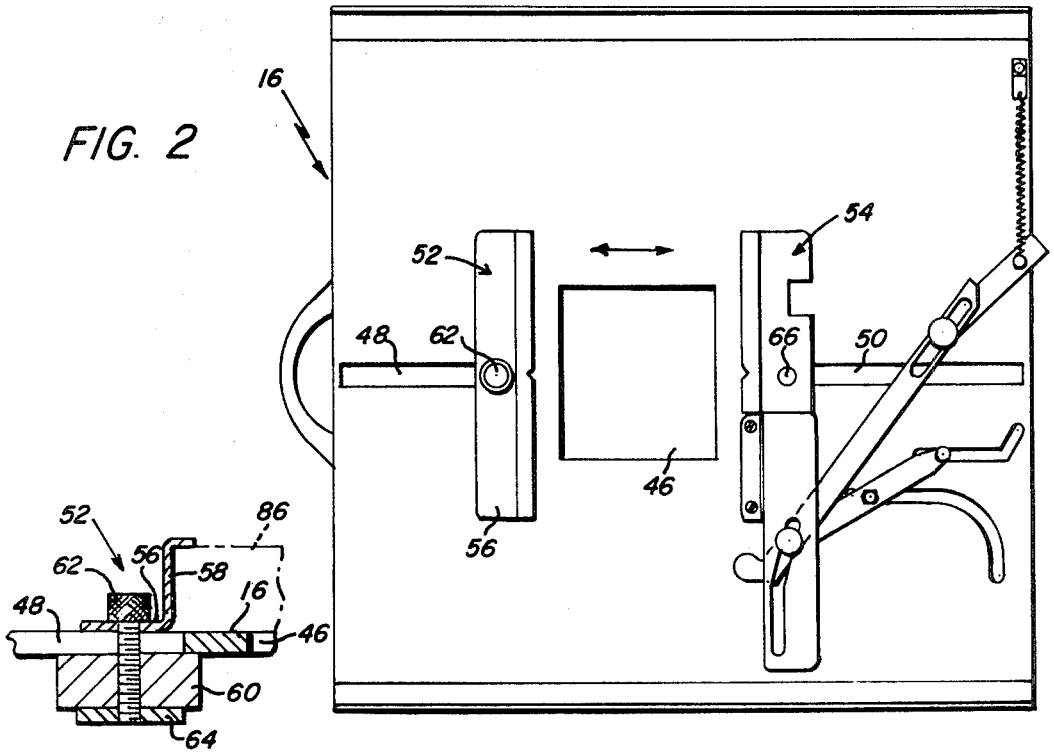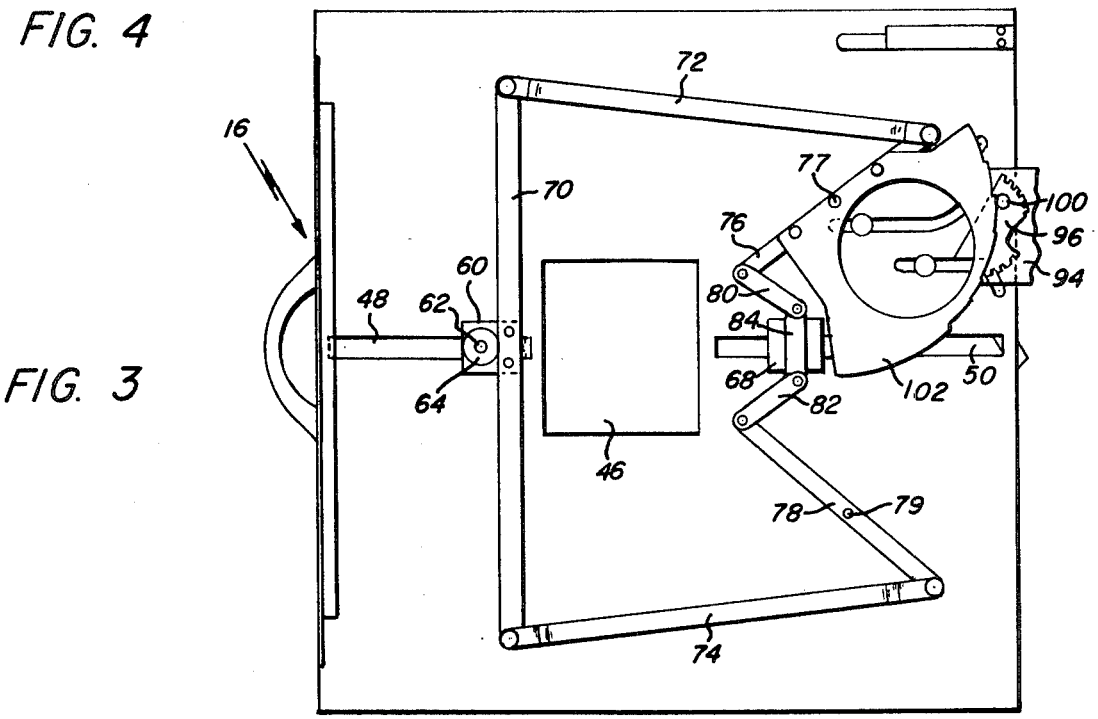

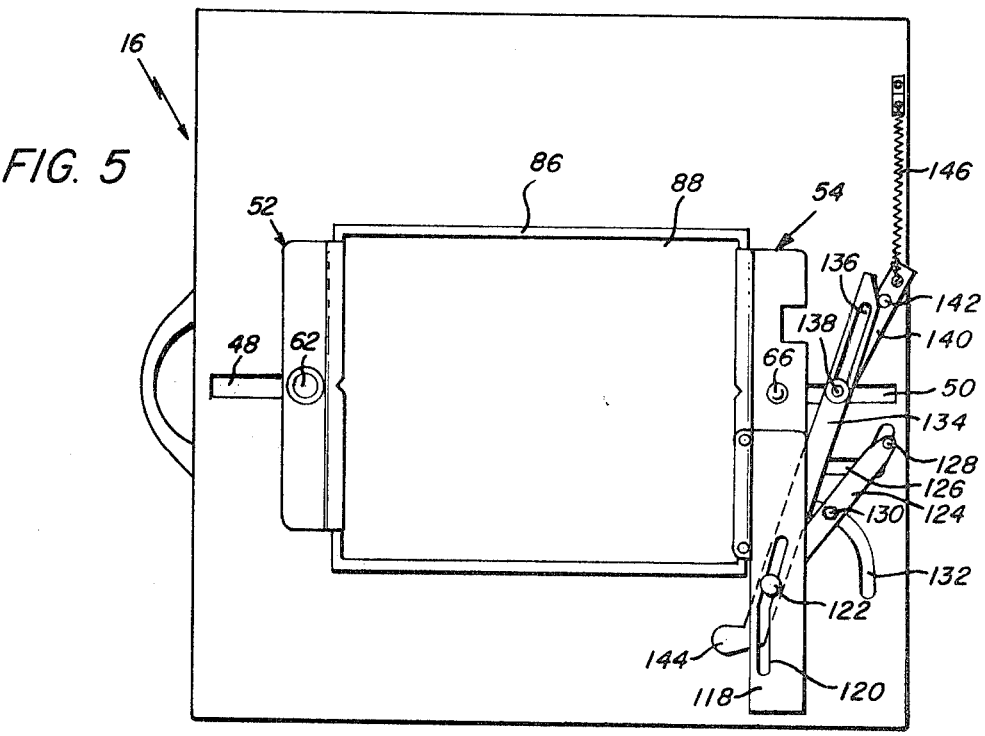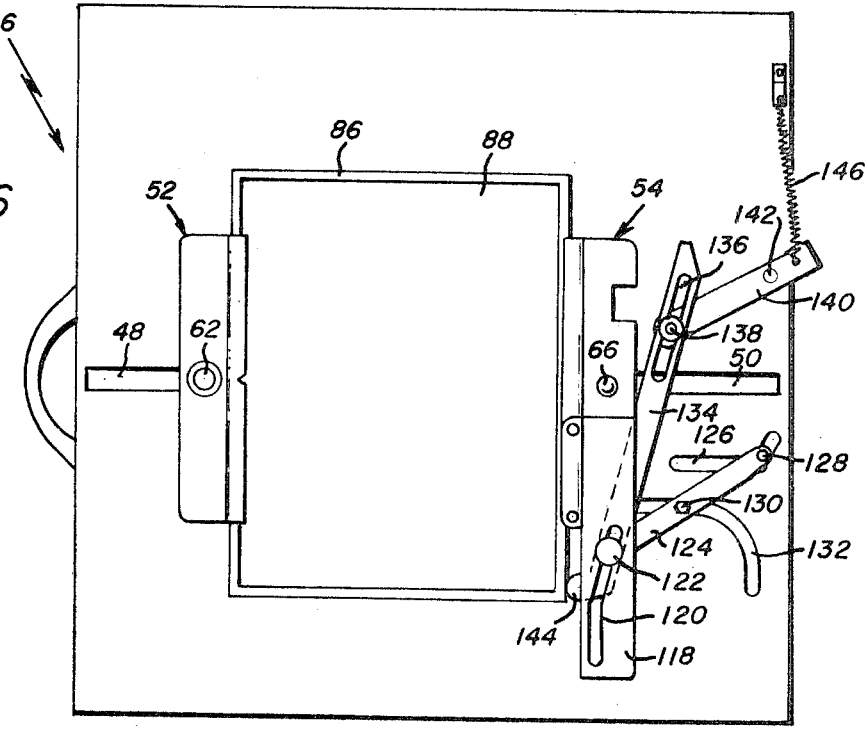

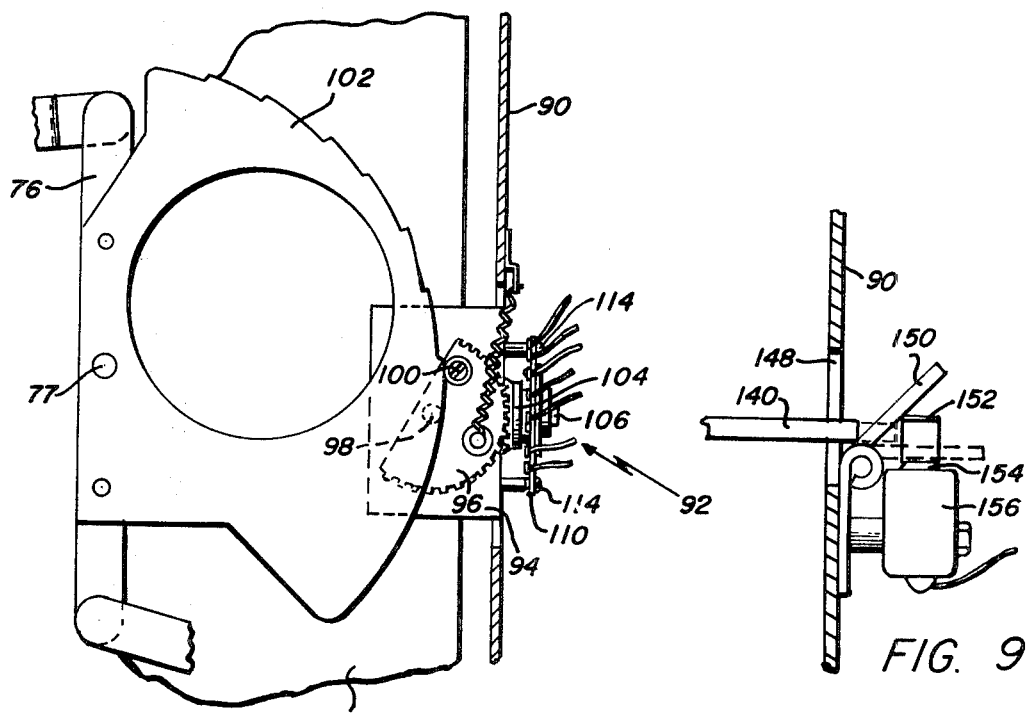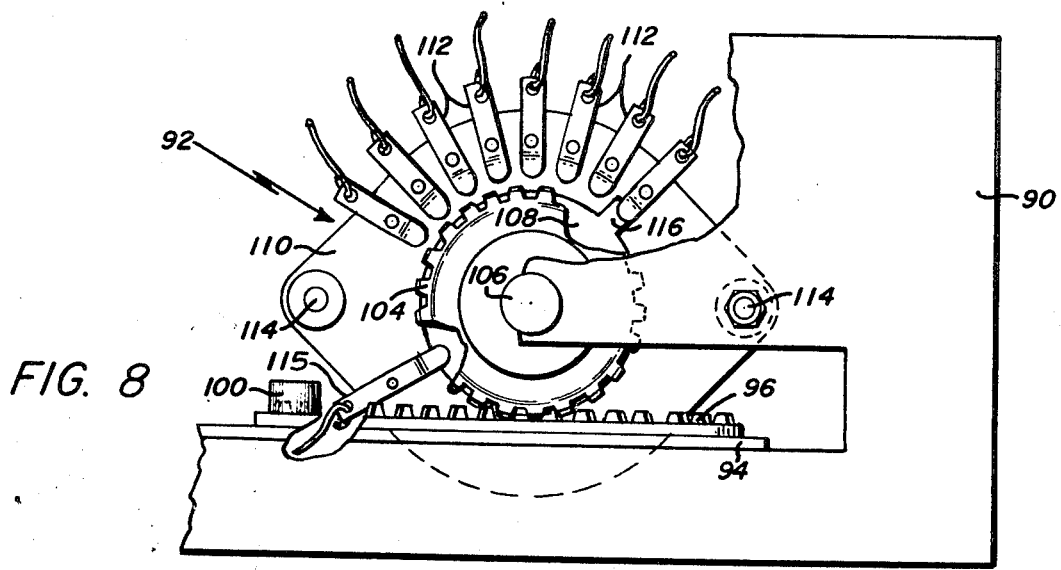

INVENTORS
LEONARD F. PEYSER
GORDON F. BAVOR
BY
AGENT

INVENTORS
LEONARD F. PEYSER
GORDON F. BAVOR
BY
AGENT

INVENTORS
LEONARD F. PEYSER
GORDON F. BAVOR
BY
AGENT

INVENTORS
LEONARD F. PEYSER
GORDON F. BAVOR

X-RAY APPARATUS

BACKGROUND OF THE INVENTION

X-ray apparatus is commonly used in the medical field for diagnostic and therapy treatment purposes. It is well known that X-radiation must be carefully controlled and that persons skilled in the art should be employed for the purpose of operating X-ray apparatus, particularly where such apparatus is utilized for treatment of human beings. For example, it is known that relatively small areas of a human body can be treated by X-radiation for selected periods of time, or that the function of one or more internal organs may be examined by the use of X-rays while a subject is being exposed to X-radiation for a period of time. It is necessary, however, to carefully control the length of exposure time so that the patient will not be harmed by undesired X-ray exposure. It is also desirable that the area of a patient's body which is being exposed to X-radiation be maintained as small as possible so as not to expose other areas of the body unnecessarily to X-radiation.

Attempts have been made to control the size of an irradiated area by the provision of collimating means which can be attached to the port of an X-ray tube so as to form a cone of radiation of a predetermined size and configuration. X-ray apparatus also is provided with means whereby the X-ray tube may be moved toward or away from the subject, also thereby controlling the resultant size of the irradiated area.

However, there has been developed no positive assurance that an irradiated area is of the desired size and configuration. For example, when X-raying a portion of the body of a person lying on a suitable table, the X-ray tube is positioned above the body, for example, and a film is supported in a suitable cassette beneath the body. Then, with the X-ray tube supposedly located to emit a beam of X-radiation through the body to the film, the tube is operated by suitable application of electrical potential to the electrodes therein. However, very often it is found that area will not be as small or smaller than the film size. Any X-radiation beyond the borders of the film is unnecessary, useless, may be harmful to the patient, and, due to unnecessary secondary scatter generated by the patient's body, is detrimental to the clarity of the film.

Accordingly, in order to achieve most efficient and safe results, it is highly desirable that X-ray apparatus by utilized wherein the resultant cone of radiation is directed onto a subject so that overexposure will not result.

SUMMARY OF THE INVENTION

In accordance with the aforementioned objectives, the present invention relates to X-ray apparatus which is of an automatic or semiautomatic nature and which permits operation of an X-ray tube only when the components of the system are in proper relationship such that the irradiated area conforms substantially to the size of a film being used in the device. The invention comprises apparatus which utilizes a film holding means arranged to support films of various sizes, which films may be rectangular and may be supported with either their long or short sides in aligned, parallel relationship with the length of the table, an X-ray tube or other source of X-radiation mounted for movement toward and away from the patient and, consequently, of the film, and variable field-size collimating means associated with the X-ray generator for shaping the beam of X-radiation emanating from the generator. The system further comprises electrical means associated with the cassette or other film holding device for producing an electrical signal indicative of the size of the film and of its direction, a focal distance measuring unit for establishing an electrical signal indicative of the distance between the X-ray source and the film, and electrical means interconnecting the components of the device for determining from such electrical signals whether or not proper adjustment of the collimating unit has been made in accordance with the size of the film and the distance of the X-ray source therefrom to produce an irradiated area of a size conforming to the film size. This electrical system may function to prevent operation of the X-ray tube until the collimating unit has been properly adjusted, either manually or automatically, whereupon operation of the tube is then permitted.

BRIEF DESCRIPTION OF THE DRAWINGS

Other objectives and advantages of the invention will become apparent from the following description taken in connection with the accompanying drawings wherein:

FIG. 1 is a perspective view of X-ray apparatus embodying a preferred form of the invention;

FIG. 2 is a top plan view of a film holding tray in accordance with this invention;

FIG. 3 is a view of the bottom of the tray shown in FIG. 2;

FIG. 4 is an enlarged fragmentary sectional view of a film clamp;

FIG. 5 is a top plan view of the tray shown in FIG. 2 illustrating the device with a film mounted in place and extending in the cross-table position;

FIG. 6 is a top plan view similar to FIG. 5 showing a film mounted in the cross-tray position;

FIG. 7 is an enlarged fragmentary view of a portion of the bottom of the tray shown in FIG. 3 and further illustrating the film measuring apparatus associated therewith;

FIG. 8 is an enlarged elevational view of the switch portion of the film measuring apparatus;

FIG. 9 is an enlarged view of a portion of the film measuring apparatus;

DESCRIPTION OF THE PREFERRED EMBODIMENTS

Figure 10:
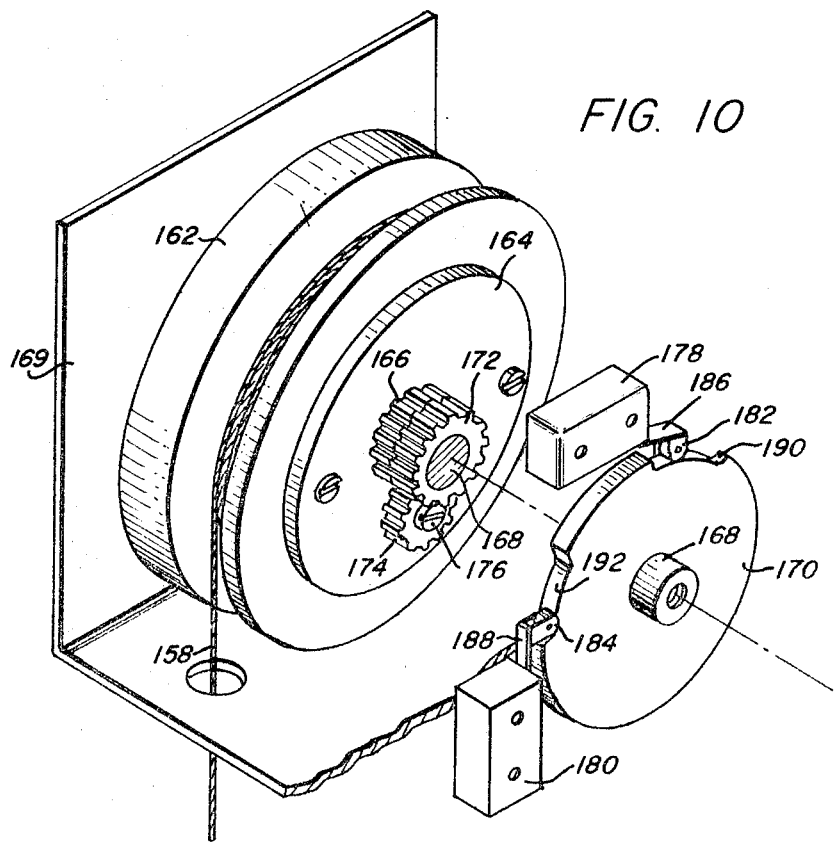
FIG. 10 is an isometric view of the distance measuring apparatus.

Referring more particularly to the drawings, wherein like characters of reference designate like parts throughout the several views, there is shown in FIG. 1 an X-ray table 10 which includes a top 12 on which a patient may recline and a base 14 which supports the top. The table 10 may be of any type of construction and design and may be movable in any known manner so as to position a patient suitably for X-ray treatment or diagnosis.

Table 10 further includes means for slidably supporting a cassette tray 16 immediately beneath the top 12, the tray 16 being used to support a film carrying cassette, as will be described.

At one side of the table 10 is located a vertically extending pole 18 upon which X-ray generating apparatus 20 is adjustably mounted. For purposes of simplification in this description, the apparatus 20 is shown and described as being movable vertically on pole 18 toward and away from the table 10, and also movable in a horizontal plane about the longitudinal axis of the pole. The apparatus 20 is also capable of rotation about the axis of a pivot 19 for angular adjustment as desired. However, the present invention is contemplated for use with any suitable supporting system for the X-ray generating apparatus whereby the X-ray source may be controllably moved toward and away from the table and a patient thereon. Such a supporting system may comprise any suitable type of ceiling, wall or floor mount.

In generalities, the supporting system shown in FIG. 1 comprises a rigid supporting base 22 having a central hub through which pole 18 extends and which provides means whereby apparatus 20, which is mounted thereon, may be movable either vertically or horizontally. Base 22 includes diametrically opposed arm portions in each of which is mounted a respective one of a pair of upper rods 24 and a respective one of a pair of lower rods 26. The rods 24 and 26 extend horizontally and are adapted to overlie table 10, the opposite ends of the rods being suitably affixed to bracket 28 are shown. Slidably mounted on at least the upper rods 24 are a pair os support members 30 to which are attached ends of an X-ray generator support bracket 32. Bracket 32 thereon, as a support for an X-ray source 34 which is provided with a pair of horns 36 by which cables 38 are electrically connected to an X-ray tube (not shown) located within the housing of the X-ray generator. The X-ray generator 34 may be of any conventional and well-known structure which functions, when suitable electrical potentials are impressed on the X-ray tube therein, to produce a beam of X-rays in the form of a cone of X-radiation directed downwardly out of the generator housing 34 toward the table 10 and patient thereon. The cone of radiation is controlled to have a selected cross-sectional size and configuration whereby the irradiated area at the film in cassette tray 16 will extend over a desired limited area. In order to accomplish this, the beam of X-rays passes through a suitable X-ray collimator 40 whereby the size and shape may be selected by suitable manual or automatic manipulation of control knobs 42 and 44 thereon. The design and operational adjustment of the collimator will be described in detail hereinafter.

In accordance with the present invention, it is highly desirable that a patient on table 10 be subjected to a minimum area of X-radiation which will accomplish the desired objectives, that is, a patient should only be exposed in the area requiring diagnosis or treatment, and adjacent areas should receive little or no exposure if possible. Accordingly, film of a selected size will be inserted in the cassette tray 16, as will be described, and will be disposed in place beneath the top of the table, and the X-ray generator 34 will be positioned above the patient and at a predetermined focal distance from the film whereby, when the collimator 40 is suitably adjusted, the cross-sectional size and configuration of the cone of radiation to be produced by the generator 34 will be no larger than substantially the size of the film. Accordingly, means, to be described, is provided at the cassette for determining the overall size and position of the film, which means functions cooperatively with means for automatically determining the distance between the X-ray source and the film, as well as with the adjustment of the collimator 40, to provide information relating to the conformance or nonconformance of the size of the irradiated area to the size of the film.

FILM-SUPPORTING APPARATUS

Referring now to FIG. 2, there is shown a top plan view of a tray 16 which has been modified in accordance with this invention. The tray 16 is provided with a central opening 46 for phototiming purposes not concerned with this invention, and with aligned slots 48 and 50 extending longitudinally thereof on opposite sides of the opening substantially midway of the tray. A pair of clamps 52 and 54 are mounted on the top surface of the tray 16 for sliding movement toward and away from one another along a respective slot. Clamp 52 comprises a flat elongated portion 56 (FIGS. 2 and 4) which lies across slot 48 and has an upwardly portion 58 extending upwardly therefrom. Disposed against the underside of the tray directly beneath clamp 52 and slot 48 is a clamping plate or lug 60. A knurled screw 62 extends through clamp portion 56, slot 48 and plate 60 into a nut 64. It will be apparent that with screw 62 loosened, the whole clamping mechanism, including clamp 52 and plate 60, may be moved longitudinally of slot 48 as desired and then fixed in adjusted position by tightening the screw.

Clamp 54 is constructed very similarly to clamp 52 but is not provided with the adjustable locking screw 62. Rather, the clamp 54 is fixedly connected by a pin 66 to a clamp plate 68 beneath the tray 16 and slot 50.

As seen best in FIG. 3, wherein the underside of the tray 16 is shown, the two clamps are interconnected by linkage for simultaneous movement toward and away from each other. To achieve this, clamp plate 60 is provided with an extension on its side nearest opening 46 to which is riveted, screwed or otherwise affixed a central portion of a bar 70 which extends parallel with the front edge of tray 16. Thus, bar 70 is adapted to slide with clamp plate 60. Each end of bar 70 is pivotally attached to one end of a respective rearwardly extending arm 72—74, the opposite ends of which are pivoted to one end of respective cross arms 76—78, which in turn are pivoted to one end of respective links 80—82 are pivotally attached at their opposite ends to a portion 84 of clamp plate 68. Thus, it will be apparent that movement of front clamp 52 in either direction will cause simultaneous movement of the rear clamp 54 through clamp plate 60, bar 70, arms 72, 74, 76 and 78, links 80 and 82, and clamp plate 68.

Clamp plates 52 and 54 are provided so as to receive and retain therebetween a film-carrying cassette 86 as shown in FIGS. 5 and 6. The cassette comprises a rectangular frame having a central opening of one of a number of sizes within which an X-ray sensitive film 88 is mounted. The cassette and its mechanism for holding a film therein do not constitute in themselves a part of this invention. Accordingly, additional details of these features are not included herein. It will be apparent that a cassette may be mounted in the presently described device by opening the clamping means by spreading clamps 52 and 54 apart, then placing the cassette 86 between the clamps, and thereafter sliding the clamps toward one another whereupon they will move into engagement with opposite sides of the cassette. Each clamp is provided with an inwardly directed lip which overlies the adjacent portion of the cassette and aids in holding the cassette firmly in position.

The foregoing paragraphs describe the film-supporting portion of the apparatus embodying the present invention. It should be understood, however, that many details of the tray and clamping mechanism which do not have a direct bearing upon the present invention are not described herein.

FILM SIZE SIGNALING SYSTEM

The present invention may be utilized with films of any one of the several selected standard sizes and may be easily modified to accept other sizes as desired. The cassette actually is slightly larger than the film which it holds. However, a measurement of the cassette is a measurement also of the film inside it. Film sizes such as 5 inches × 17 inches, 8 inches × 10 inches, 10 inches × 12 inches, 11 inches × 14 inches, and 14 inches × 17 inches for example, are standard sizes with which this invention is readily usable.

It is necessary in accordance with this invention to measure the film (cassette) size and to convert the measurement into an electrical signal which may be fed into a circuit for integration with a focus-to-film distance measurement signal and a collimator adjustment signal in order to achieve the objectives of this invention. It is also necessary that this film size measurement also take into consideration the fact that the rectangular film and cassette may be mounted with the long side extending either parallel with or perpendicular to the front of the table. For example, the film and cassette may be mounted as shown in FIG. 5 with the short edge parallel with the front edge of the tray and table, or as shown in FIG. 6 with the long edge parallel thereto. Such a determination of the precise positioning of the film, as well as the size thereof, is necessary in order to insure that The collimator is properly adjusted to limit the size of the X-ray beam in both the $x$ and $y$ directions.

FIG. 6 shows the cassette and film in what we shall refer to as "routine" clamped position, that is, the long axis of the cassette extends across the tray. In FIG. 5 the cassette and film are located in the so-called "cross-table" position, with the long axis of the cassette being disposed perpendicular to the position shown in FIG. 6.

At the rear of the table there is provided a supporting plate 90 (FIGS. 7 and 8) on which are mounted the film size signal-producing components which include a rotary switch 92. Plate 90 may be attached in any suitable manner to the table and is provided with a shelf 94 on which a gear segment 96 is mounted for rotation about pivot 98. Gear segment 96 carries a roller 100 which is adapted to ride along the edge of a cam 102 which is carried by the crossarm 76 beneath on the underside of the cassette tray.

It will be apparent that when a cassette is mounted in the tray, the crossarm 76 will assume an angular position which is dependent upon the particular size of the cassette and, consequently, of the film therein. Such angular position of the crossarm 76 is translated to the cam 102 as rotational adjustment about point 77. The side of cam 102 opposite the pivoted side is made as a series of irregular steps corresponding to the number of standard film sizes with which the device is intended for use. Thus, when a cassette has been located in position on the cassette tray, the cam 102 will be adjusted to a position which corresponds to the particular dimension of the film in the cross-table direction. Then, when the tray is inserted into its proper position in the table, it will be slid firmly into a position where the cam 102 will engage roller 100 and will rotate the gear segment 96 a predetermined distance depending upon the particular stop of the cam which is in engagement with the roller. Thus, it will be understood that a large cassette will cause less rotation of cam 102 while a smaller cassette will cause cam 102 to rotate a greater extent. Such rotary motion will be transferred to the gear segment 96, as described.

In order to create an electrical signal as a result of such positioning of the cam 102, the gear segment 96 meshes with a drive gear 104 (FIGS. 7 and 8) fixedly carried by the rotor shaft 106 of the rotary switch 92. Shaft 106 also carries the conductive switch rotor 108 which therefore, rotates directly in response to rotation of gear segment 96, gear 104 and shaft 106.

Rotor 108 is located adjacent a dielectric switchplate 110 which carries a number of spaced contacts 112 thereon, the plate 110 being secured as by means 114 upon supporting plate 90. Rotor 108 is maintained constantly in slidable electrical contact with a terminal contact 115 which is connected into an electrical circuit which will be described hereinafter, as are spaced contacts 112. Rotor 108 carries a wiper contact 116 which, as the rotor rotates, successively contacts the spaced contacts 112. Thus, it will be apparent that as the rotor 108 is rotated by gear 104 in response to rotation of gear segment 84, the wiper contact 116 will contact a particular one of the spaced contacts 112 depending upon the particular size of the cassette being used. Thus, as will be more apparent from the description of the electrical circuit to be found hereinafter, the film size is translated into a corresponding electrical signal.

To complete the film size signaling apparatus, there is provided means for determining and indicating whether the film and cassette are located in the routine cross-tray position or in the cross-table position. Such means is clearly depicted in FIGS. 5 and 6 when considered in combination with FIG. 9. In FIG. 5, the cassette is shown in cross-table position. At the end of the tray which is disposed at the rear of the table when the tray is mounted in position for use, there is a guide plate 118 fixedly secured to the clamp 54. Guide plate 118 has an angled dogleg slot 120 therein, as shown, through which extends a slidable pin 122. Pin 122 also extends freely through a hole in one end of a guide arm 124, the other end of arm 124 being controlled movement along a second dogleg-shaped slot 126 in tray 16 by sliding engagement of a pin 128 thereon with the slot. Midway of the arm 124 is another follower pin 130 which engages a third arcuately shaped slot 132 as shown. Thus, forward and rearward movement of clamp 54 and plate 118 will cause movement of the midportion of guide arm 124 within the limits prescribed by slot 132. Simultaneously, engagement of pin 122 with slot 120 will cause angular displacement of the arm 124 under control of pin 128 and slot 126.

A feeler arm 134 extends behind the clamp 54 as shown in FIG. 6 and is pivotally connected to pin 122 at a point spaced from one end thereof. The other end of feeler arm 134 is provided with a longitudinal slot 136 within which is slidably located a pin 138 carried by one end of a switch-actuating arm 140. Arm 140 is pivotally mounted on tray 16 by pin 142. Thus, movement of the clamp 54 will, through links or arms 124 and 134, cause pivotal movement of switch-actuating arm 140. The extent of angular or rotary movement of arm 140, however, is actually controlled by the feeler arm 134 and particularly by the position of the opposite end of feeler arm 134. Said opposite end of the feeler arm 134 carries and inwardly protruding feeler 144 which is adapted to engage an edge of a cassette when a cassette is mounted in a cross-tray position as shown in FIG. 6. This contact between the feeler 144 cassette causes feeler arm 134 to pivot slightly about pin 122, thus moving switch-actuating arm 140 to a position where its free end projects substantially outwardly from the rear of the tray. When the feeler 144 does not contact a cassette, the action of a spring 146 on arm 140 retracts the end of the arm as shown in FIG. 5, indicating that a cassette is in the cross-table position.

As shown in FIG. 9, the outer end of switch-actuating arm 140 extends through an opening 148 in the supporting plate 90 and is adapted to engage a hinged switch-operating member 150 which is secured similarly to a hinge on the rear surface of plate 90. When the adjacent end of arm 140 is made to protrude more fully through opening 150, it will push hinged operating member 150 into engagement with a sprinlike actuating lever 152, depressing the member 152 to cause operation of the actuating member 154 of microswitch 156. Switch 156 is suitably attached to support 90 and thus is open or closed depending upon whether a cassette and film are in cross-tray or cross-table position, as described. Switch 156 is also interconnected into circuitry to be described hereinafter and thus imparts to the circuitry information relating to the two positions of the cassette and film.

DISTANCE MEASURING APPARATUS

In accordance with this invention, there is also provided means for measuring the distance between the X-ray source and the patient or, more particularly, the film which is disposed in the cassette in the table beneath the patient. This measuring apparatus comprises a cable 158 (FIGS. 1 and 10) having one end suitably attached to the table, preferably at the rear thereof adjacent post 18. The cable 158 extends upwardly from the table and into a box 160, preferably suitably mounted on the base 22 which is slidably mounted vertical movement, as hereinbefore described, on post 18. Within the box 160 there is provided the mechanism which performs the actual measuring function, shown in FIG. 10. This mechanism includes a conventional spring winding reel 162, details of which are not disclosed herein but, being conventional, can be simply described as a spring mechanism which permits the cable 158 to be unwound as the X-ray apparatus 20 and box 160 are raised vertically along post 18. Similarly, when the apparatus 20 and box 160 are lowered toward table 10, the spring mechanism will function to rewind the cable 158. Attached to the reel 162 is a disc 164 to which is fixed a gear 166. Gear 166 is mounted on a stationary shaft 168 suitably supported on a plate or bracket 169. Rotatably mounted on the other end of shaft 168 is a cam 170 which has fixed to its rear surface a second gear 172. Cam 170 and gear 172 are fixed to shaft 168 for rotation therewith. Additionally, there is mounted between disc 164 and cam 170 a sun gear 174. Sun gear 174 is maintained in mesh, as by a shaft 176 and suitably spacers (not shown) thereon, simultaneously with both gears 166 and 172.

In order to achieve mechanical cooperation of the various parts of the device whereby cam 170 will be rotated slight amounts upon winding and unwinding of cable 158, the gear 172 which is fixed to cam 170 is provided with a number of teeth thereon which is unequal to the number of teeth on gear 166. For example, gear 166 may be provided with 16 teeth throughout its periphery while gear 172 has only 15 teeth. Accordingly, when cable 158 is wound or unwound, disc 164 and sun gear 174 thereon will rotate. This will cause sun gear 174 to walk around gear 166, and upon completing a full revolution therearound will move gear 172 and cam 170 a distance effectively equivalent to the distance between two teeth on gear 172. Actually, in one embodiment of this invention, one revolution of disc 164, and consequently of sun gear 174 about gear 166, is equal to about 6 inches of vertical travel of the X-ray apparatus 20 on pole 18.

In order to transfer this mechanical motion to its electrical equivalent, there are provided two single-pole double-throw microswitches 178 and 180 each of which includes a respective cam follower 182—184 which engages the periphery of cam 170. Cam followers 182—184 are suitably mounted on respective switch operating members 186—188 whereby, when followers 182—184 move inwardly or outwardly toward or away from shaft 168, the switches will be operated. To provide such movement of the cam followers, the cam 170 is provided with a pair of spaced elongated indentations or recesses 190 and 192 with which the cam followers are adapted to engage as the cam 170 is rotated. The recesses 190—192 are suitably spaced and are of such lengths that they will function cooperatively to operate the switches when the cable 158 has been extended to indicate that the X-ray apparatus 20 is spaced at various distances from the film carried by the cable 10. For example, these distances are commonly 36 inches, 40 inches and 48 inches.

The actual function of these switches, in response to their actuation by cam 170, will be fully described in the operation of the device and in the detailed description of the electrical circuit to be found hereinafter.

Figure 11:
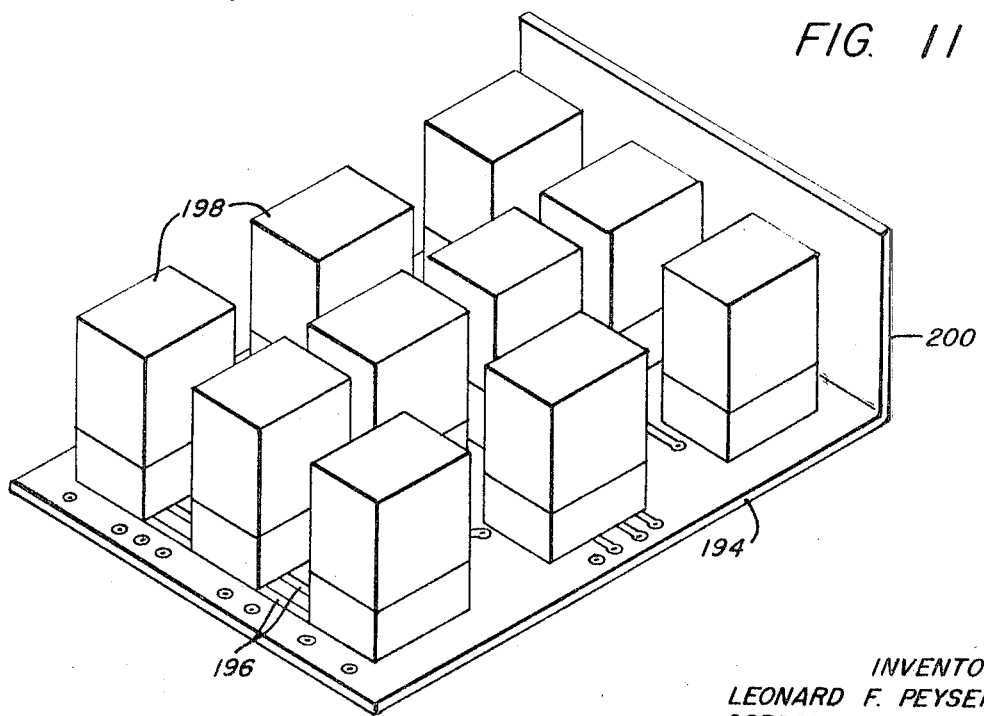
FIG. 11 is an isometric view of the printed circuit and relay components utilized in this invention.

Referring to the box 160, this box also contains some of the basic electrical or electronic components to which the film size signaling system and the distance measuring system are connected. In FIG. 11 there is shown a plate 194 which is, in actuality, a printed circuit device with suitable circuitry 196 being imprinted on one or both sides thereof in any well-known manner. Components such as relays 198 may be suitably plugged into the board or plate 194 and will be described hereinafter. The board, including front plate portion 200, is mounted in box 160 as indicated in FIG. 1.

COLLIMATING APPARATUS

Figure 12:
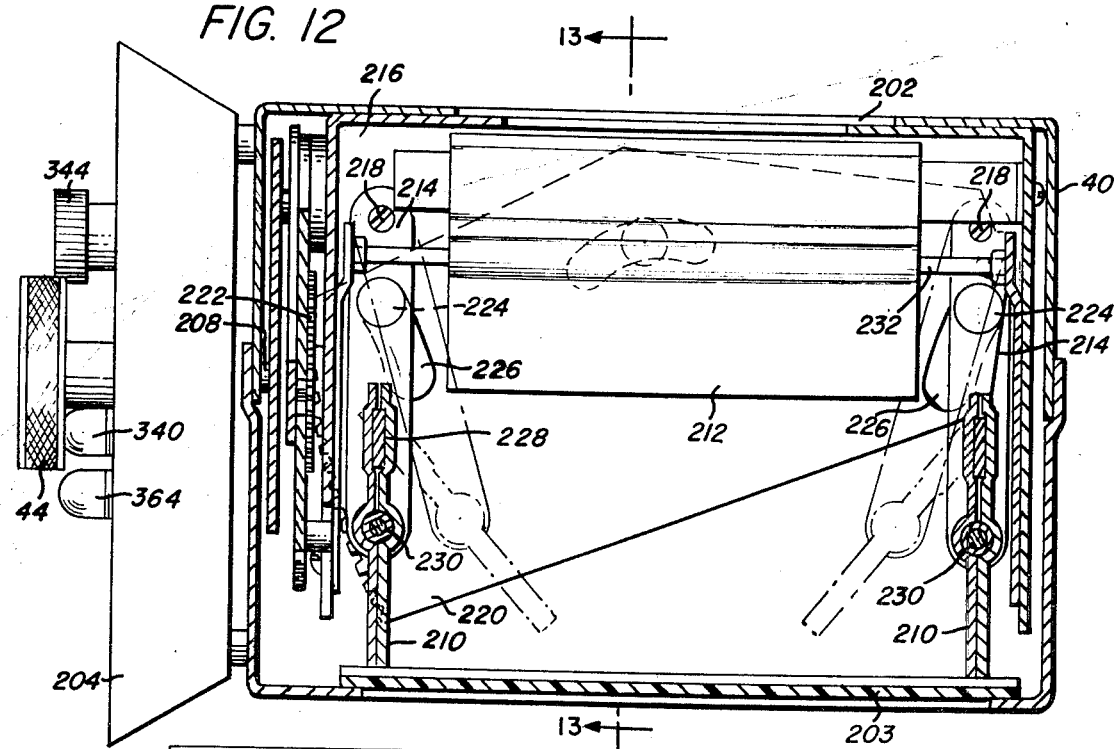
FIG. 12 is a longitudinal sectional view through the X-ray collimator.
Figure 13:
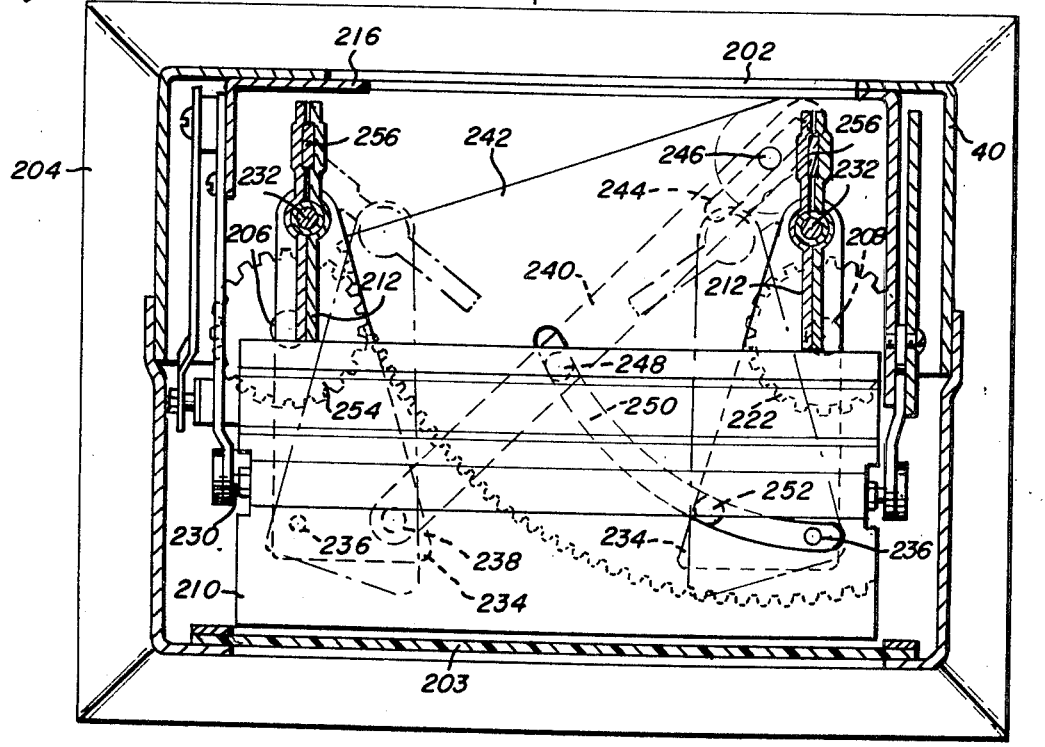
FIG. 13 is a transverse sectional view taken on line 13-13 of FIG. 12.

In normal operation of X-ray apparatus of the character described herein, the X-ray source 34 is mounted so that a beam of X-radiation is caused to be emitted through the collimating apparatus 40 shown in FIGS. 12 and 13. The X-ray source includes a casing within which is located an X-ray generator or tube which functions, in the normal manner, to produce the beam of X-radiation from a point source therein and as is clearly shown, for example, in U.S. Pat. No. 2,164,997, the beam of radiation in the form of a cone being emitted from a suitable port through an opening 202 in the casing 40 of the collimator. The radiation is intended to pass through the collimator 40 and exists therefrom through a bottom window 203 of X-ray transparent material.

The collimator casing is of generally rectangular configuration and may be suitably attached to the X-ray tube or source 34 by any suitable means. On the front of the collimator is a separate casing 204 which houses the collimator signaling apparatus to be described hereinafter and through which passes a pair of rotatable shafts 206 and 208 (FIGS. 12 and 13) on the outer ends of which are positioned knobs 42 and 44 respectively.

There are provided within collimator casing 40 a pair of lower aperture plates 210 and a pair of upper aperture plates 212 which serve to define the X-ray beam. The lower collimating elements or aperture plates 210 are supported on arms 214 pivoted to an inner unit 216 of a frame which is suitably secured in any known manner to the inside of casing 40, preferably at the top thereof.

Reference may be made to U.S. Pat. No. 3,163,762 for details of one form of suitable collimating structure with which the present invention may be used. The arms 214 are adjustably swung about their pivots 218. The movement of these arms is indicated by the dot-dash lines in FIG. 12, and may be accomplished by means of a gear sector 220 which is engaged by a gear 222 mounted on shaft 206, the arms 214 being coupled to sector 220 by means of rollers 224 received in arcuate slots 226 therein. The aperture plates 210 also comprise bars 228 pivotally connected to further linkage, as described in the aforementioned patent, so that the aperture plates have a combined bodily swinging movement of rotation about their respective shafts 230. This, therefore, provides means whereby one cross-sectional dimension of a rectangular beam of radiation is achieved upon manual rotation of knob 42.

The adjustment in the other plane of collimation is similar and is achieved by manual rotation of knob 44 which is mounted on one end of shaft 206. To achieve this, the upper plates 212 are carried on shafts 232 which are swingingly supported on triangular plates or arms 234 pivoted to the frame at 236. One of the arms 234 is pivotally connected at 238 to a link 240 maintained in radial position with reference to a gear sector 242 by a slot 244 in the link and a pin 246 coaxial with the sector axis. The link 240 carries a roller 248 engaging an arcuate slot 250 in the gear sector 242, while the other arm 234 carries a roller 252 also engaging in this slot 250. In consequence, the gear sector 242 may be rotatably adjusted by means of rotary movement of a gear 254 which is mounted on shaft 206. The plates 212 are swung about pivot points 232 as indicated by the dot-dash lines in FIG. 13, the plates 212 also including bars 256 which are suitably connected to linkage, not shown, as to give these upper elements a combined swinging and turning movement as in the case of the lower elements 210.

From this brief description and from study of the aforementioned patent, it will be apparent that rotary movement of shafts 206 and 208 will achieve adjustment of the respective pairs of aperture plates in a manner which will define the boundaries of the beam of X-radiation passing through the collimating device so that the area of the beam impinging upon the film in the cassette located in the table may be controlled.

However, in accordance with this invention, means is provided for insuring that the boundaries of the beam of radiation at the film do not extend beyond the boundaries of the film itself.

COLLIMATOR CONTROL UNIT

Figure 14:
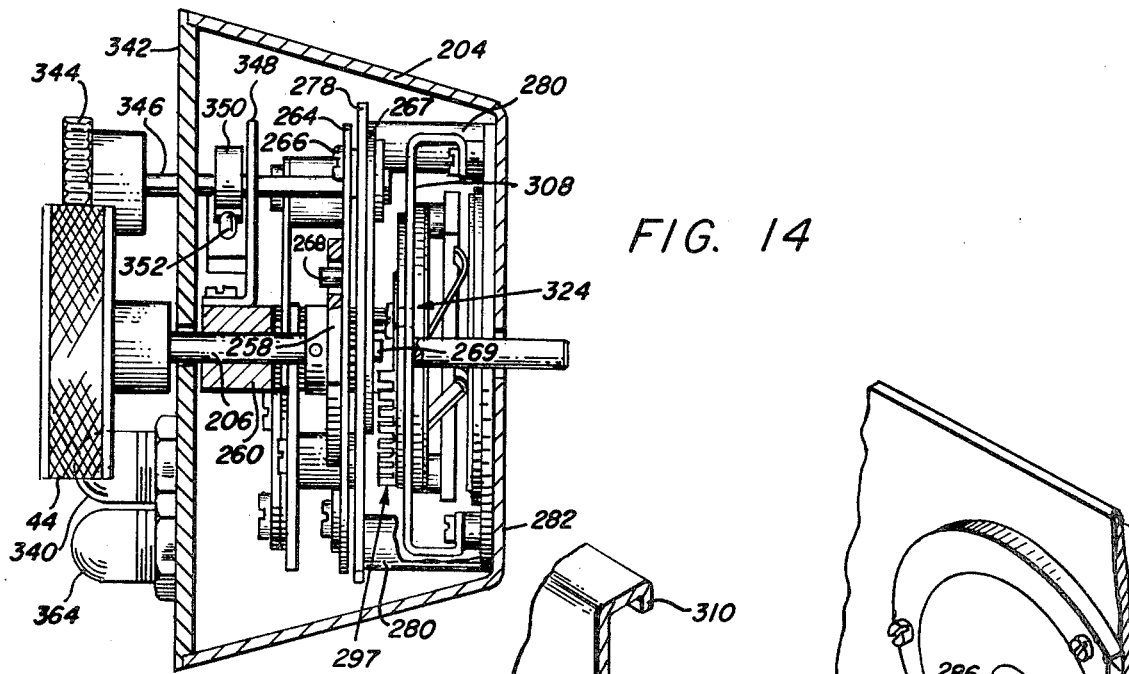
FIG. 14 is a vertical sectional view through the collimator adjustment recording system mounted on the front of the collimator.
Figure 15:
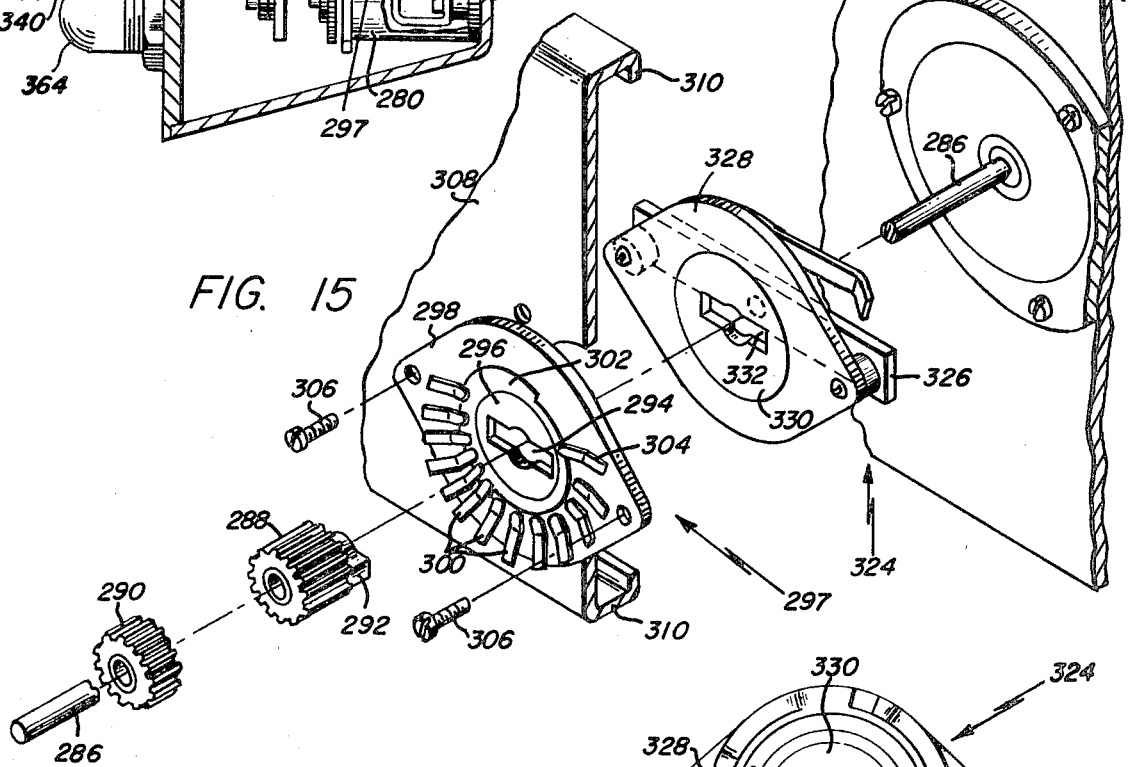
FIG. 15 is an exploded view of the collimator adjustment recording switches and switch operating means.
Figure 16:
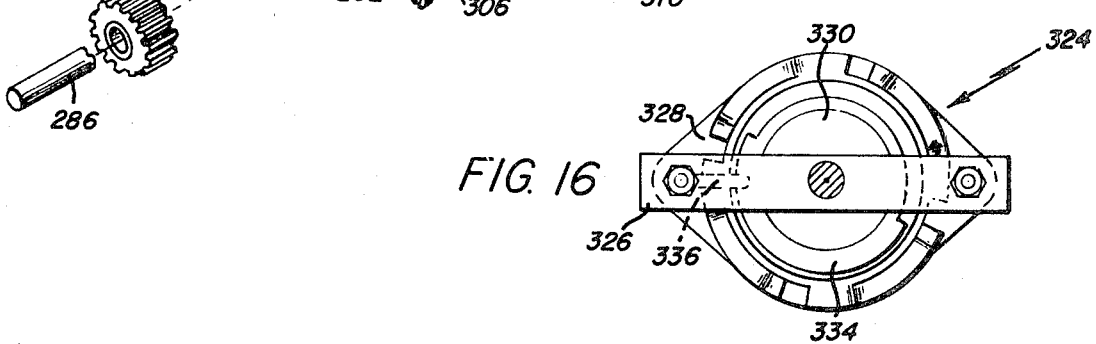
FIG. 16 is a rear view of one of the collimator adjustment recording switches.
Figure 17:
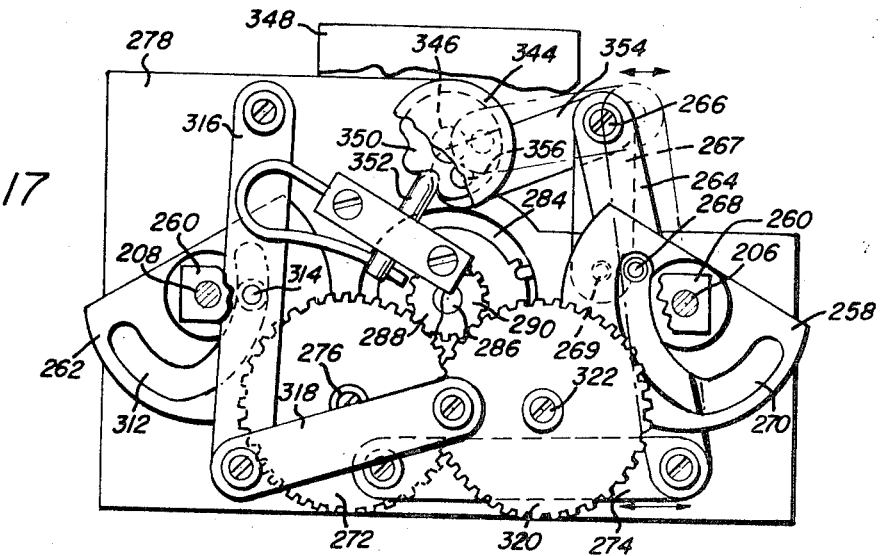
FIG. 17 is a front elevational view of the collimator adjustment recording apparatus shown with the front of the housing thereof removed.
Figure 18:
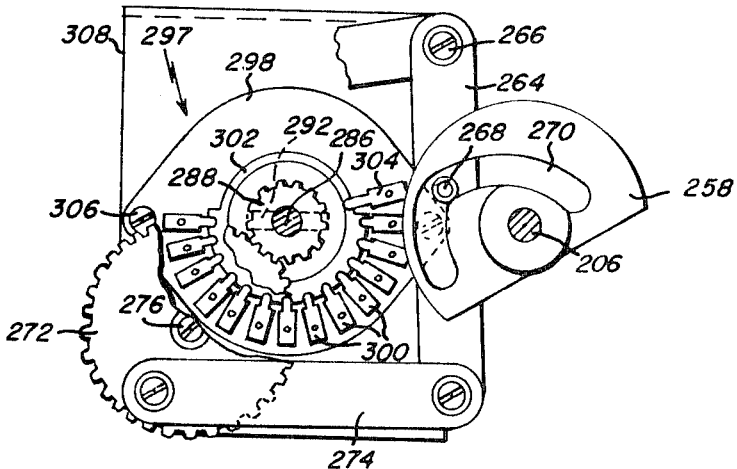
FIG. 18 is a front elevational view of one of the collimator adjustment recording devices.
Figure 19:
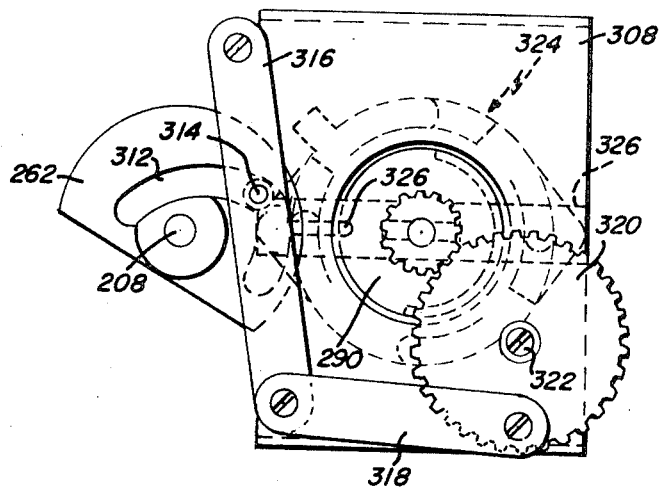
FIG. 19 is a front elevational view similar to FIG. 18 of the second collimator adjustment recording device.

The mechanism, mechanical and electrical, for insuring that the cross-sectional size or area of the beam of X-radiation is not substantially larger than the size of the film being used is shown and described in FIGS. 14—19. From this description it will be understood that the term "cross-sectional" as applied to the beam of radiation is intended to refer to a plane through the beam perpendicular to its axis, and that the area referred to is the area at the film which is actually irradiated. It will also be understood that the size of such area, in accordance with this invention, will never be larger than the film being used and that the area will have the same general configuration as the film, that is, square, rectangular, or as otherwise designed. Referring to FIG. 14, there is shown the housing 204 which is adapted to be mounted on the front of the collimator unit 40. As mentioned above, there is provided an operating shaft 206 which carries on its outer end knob 44 which accomplishes adjustment of the upper aperture plates in the collimating device. Shaft 206 extends completely through housing 204 and carries thereon a slotted cam 258 (FIGS. 14, 17 and 18), the shaft being rotatably supported in a transversely extending bar 260 suitably supported within the housing 204. Shaft 206 is supported adjacent one end of the bar 260 while the opposite operating shaft 208 is similarly rotatably mounted in bar 260 adjacent the opposite end thereof. Shaft 208, which carries knob 42 on its outer end, has also mounted thereon a slotted cam 262. It will be apparent that manual rotation of either of the knobs 42—44 will cause consequent rotation of the respective slotted cams 262 and 258.

A vertically extending arm 264 is pivotally mounted at its upper end at 266 to a second arm 267 pivoted at 269 to a supporting plate 278, and the lower end of arm 264 is adapted to move about the axis of the pivot 266 in response to urging by a roller 268 thereon which engages the slot 270 in cam 258. Thus, manual rotation of knob 44 will, through shaft 206, cam 258 and roller 268, swing the arm about pivot point 266. The lower end of arm 264 is connected to a gear 272 by arm 274 so that, as the lower end of arm 264 is moved, such movement is translated by arm 274 to the gear 272 which consequently rotates about its own axis. Gear 272 is rotatably mounted as by means 276 upon the vertically extending support plate 278 which, for clarity, has been omitted in FIGS. 18 and 19 and which is itself mounted as by suitable studs or other connecting means 280 upon the backplate 282 of the casing 204. The supporting plate 278 is provided with a central opening 284 therein (FIG. 17) through which extends a switch operating shaft 286 (FIGS. 15—19) carrying a pair of pinion gears 288 and 290 thereon. Pinion gear 288 is maintained in meshed relation with gear 272, and, thus, is rotated when gear 272 is made to rotate as described. Pinion gear 288 has on its rear surface a key 292 (FIG. 15) which is adapted to mate with an opening 294 in the rotor 296 of a wafer switch 297 (FIGS. 15 and 18) whereby rotation of pinion gear 288 will cause consequent rotation of rotor 296. Rotor 296 forms a part of a rotary switch which comprises a dielectric supporting disc having a conventional annular contact portion 302, and a main terminal 304 carried by switch disc 298 is maintained in constant contact with contact portion 302, contact 304 being connected into circuitry as will be described. The individual contacts 300 on the main switch portion are each individually connected to the circuitry as will be described. From the foregoing, it will be apparent that rotary movement of knob 42 will thus be mechanically transferred into consequent rotary movement of rotor 296, whereupon the electrical circuit will be conditioned in response thereto by engagement of annular contact portion 302 with one or more of switch contacts 300. Switch disc 298 is immovably fixed by means of screws or the like 306 to a vertically extending support bracket 308 which is secured as by flanged portions 310 thereof and suitable bolts to the backplate 282 of casing 204.

Since shaft 206 also functions when rotated to cause adjustment of one set of aperture plates in the collimator, it will be understood that the switch 297 will be electrically conditioned or adjusted in correspondence with the adjusted position of the respective set of aperture plates. Accordingly, an electrical signal will be produced by the adjustment of switch 297 which will indicate the specific adjustment of the respective aperture plates, as will be understood from the following description of the electrical circuit.

Referring now to operating shaft 208 and cam 262, this cam also contains a slot 312 (FIGS. 17 and 19) within which is disposed a roller 314 carried by a second vertically extending arm 316 which is pivotally mounted directly to supporting plate 278 at its upper end. The lower end of arm 316 is pivoted to one end of a link 318, the other end of which is pivoted to a second gear 320 which is also rotatably attached to supporting plate 278 as at 322. Gear 320 is maintained in meshed relation with the second pinion gear 290 on shaft 286. Pinion gear 290 is fixed directly upon shaft 286 for rotation therewith in response to rotary movement of gear 320. Accordingly, it will be understood that rotation of knob 42 and shaft 208 will, through cam 262, roller 314, arm 316 and link 218, cause rotation of gear 320, pinion gear 290 and shaft 286.

Shaft 286 extends freely through pinion gear 288 and switch 297, as well as through supporting bracket 308, and is connected to a second rotary wafer switch 324 by means of an arm 326 (FIGS. 15 and 16) which is fixed directly to the shaft 286 at its midpoint and is connected to a dielectric switchplate 328 adjacent its ends. Thus, it will be apparent that rotation of pinion gear 290 by gear 320 will cause consequent rotation of shaft 288 and switchplate 328.

Switch 324 includes a rotor 330 which is disposed within an opening in switchplate 328 and which has an opening 332 therein of a size and shape for mating with the key 292 on pinion gear 288. Thus, it will be understood that rotation of pinion gear 288 and key 292 will cause simultaneous rotation of rotors 296 and 330. Accordingly, the rotors of both switches 297 and 324 will be adjusted simultaneously by manual rotation of knob 44, while manual rotation of knob 42 will cause rotary adjustment of the switchplate 328 with respect to rotor 330. As shown best in FIG. 16, rotor 330 is provided with a conventional annular contact portion 334 which is adapted to slidingly engage a contact 336 carried by and fixed to switchplate 328. Contact 336 is connected into the circuitry to be described by any suitable connecting means whereby an electrical signal will be produced which is indicative of the position of the rotor 330 with respect to contact 336.

Accordingly, since rotation of shaft 208 effects adjustment of the second set of aperture plates in the collimator, it will be understood that the adjustment of switch 324 will correspond to such adjustment of the second set of aperture plates. Thus, the signals produced by switches 324 and 297 will indicate the adjustment of the collimator plates, and, therefore, the cross-sectional size of the cone of X-radiation from the X-ray source.

As pointed out in the foregoing portion of the description of the film measuring apparatus, it is necessary to determine whether the film is located in the cross-table or cross-tray position. Accordingly, when the switch 156 disclosed in FIG. 9 is operated, this will close a circuit to a signal light 340 on the panel 342 forming the front of the housing 204 which is mounted on the front of the collimator 40. This will indicate to an operator of the apparatus that means must be provided for adjusting the collimator position measuring system accordingly. Manual adjustment is achieved by means of a knob 344 (FIGS. 14 and 17) mounted on the outer end of a shaft 346 which is carried by a suitable supporting bracket 348 secured at its lower end to bar 260. Shaft 346 carries a cam 350 thereon, which cam is provided with a pair of spaced indentations adapted to receive a spring depressed detent 352 for indexing purposes. Cam 350 has one end of a link 354 (FIG. 17) pivotally attached thereto as at 356 and the other end of link 354 is pivotally attached to the upper end of arm 264. Since arm 264 is itself pivotally attached to the supporting plate 278 by arm 267, rotation of the cam will, through link 354, cause movement of the pivot point 266 for arm 264. This will consequently also alter the adjustment of the gear 272 and, consequently, of switch rotor 296. Such adjustment of rotor 296 and consequent adjustment of rotor 330 of switch 324 will compensate for the cross-table position of the film and cassette in the tray beneath the patient. Alteration of switch rotors 296 and 330 alters the electrical conditioning of each rotor in relation to its respective set of aperture plates in the collimator to the extent that aperture plates 212 (FIG. 13) will be closed further with the same knob position than will be the case under "routine" conditions. Rotor 330 will make contact with switch contact 336 with less travel of shaft 208, and this provides a larger aperture than when operating under "routine" conditions.

Figure 20:
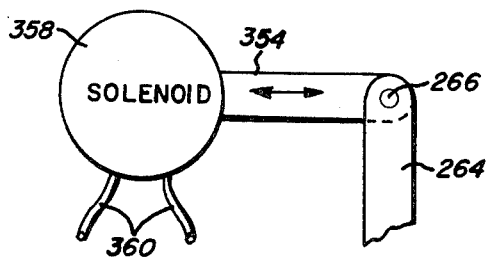
FIG. 20 is a fragmentary diagrammatic view of an alternative device for automatically adjusting the rotary switches in accordance with the cross-table or cross-tray position of the film.

In automatic operation of the portion of the system which controls the "cross-table" cassette indicator, the manually operated knob 340 and cam-detent mechanism 350—352 are replaced by means such as a solenoid 358, rotary type or otherwise, to which link 354 is attached at one end as diagrammatically illustrated in FIG. 20. The solenoid 358 may be suitably mounted such as by being bolted or otherwise attached to the supporting plate 278 and is connected into the circuitry to be described by leads 260 so that, when the cross-table indicator switch 156 is operated, the circuit to the solenoid will be operated by typical latch or linkage to position the pivot point 266 as required, thus adjusting the rotary switches 297 and 324 in correspondence with the cross-table or cross-tray position of the cassette.

Figure 21:
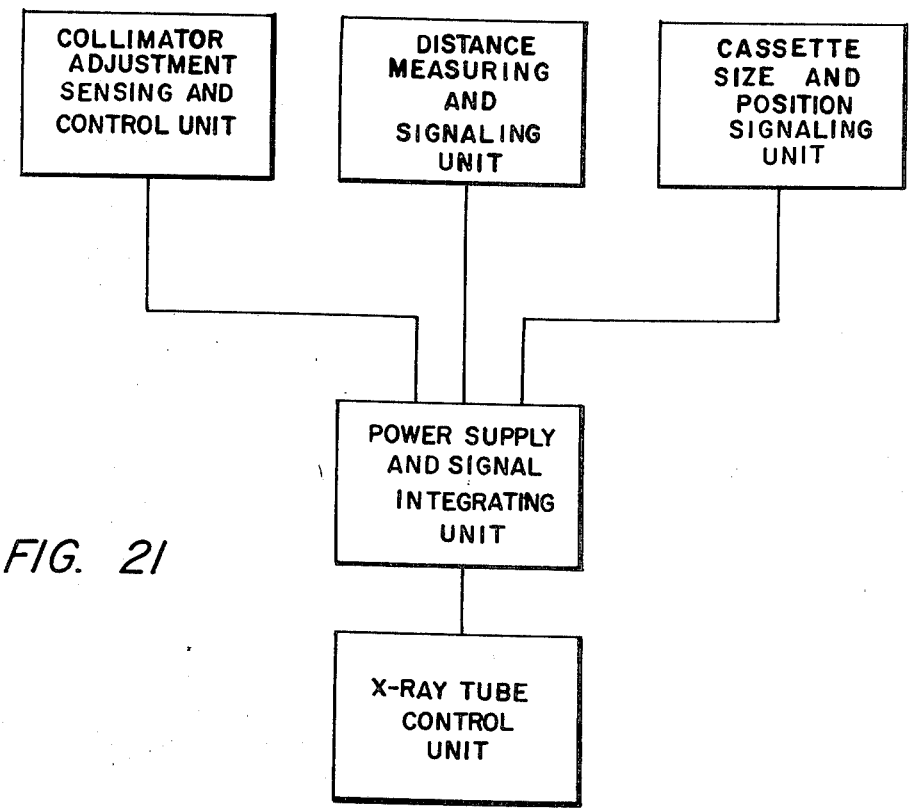
FIG. 21 is a block diagram of the invention.

In FIG. 21, the block diagram illustrates the system embodying the present invention. It will be noted that signals from the collimator adjustment detecting unit, from the distance measuring unit, and from the cassette size measuring and position detecting unit are all fed into a signal integrating and power supply unit. The integrating unit determines whether or not conditions are proper for operation of the X-ray tube unit so as to produce an area of X-radiation at the film which is substantially equal to or smaller than the area of the film. In the presently described embodiment of the invention, two signal lights 362 and 364 connected to the respective pairs of collimator aperture plate adjustment devices will indicate when the respective sets of aperture plates are properly adjusted. When one or both lights are off, adjustment must be corrected so that the X-ray tube will operate. In an automatic embodiment of this invention, one or more motors and operating mechanism (not shown) may be utilized to automatically adjust the collimator plates.

CIRCUIT AND OPERATION

Figure 22:
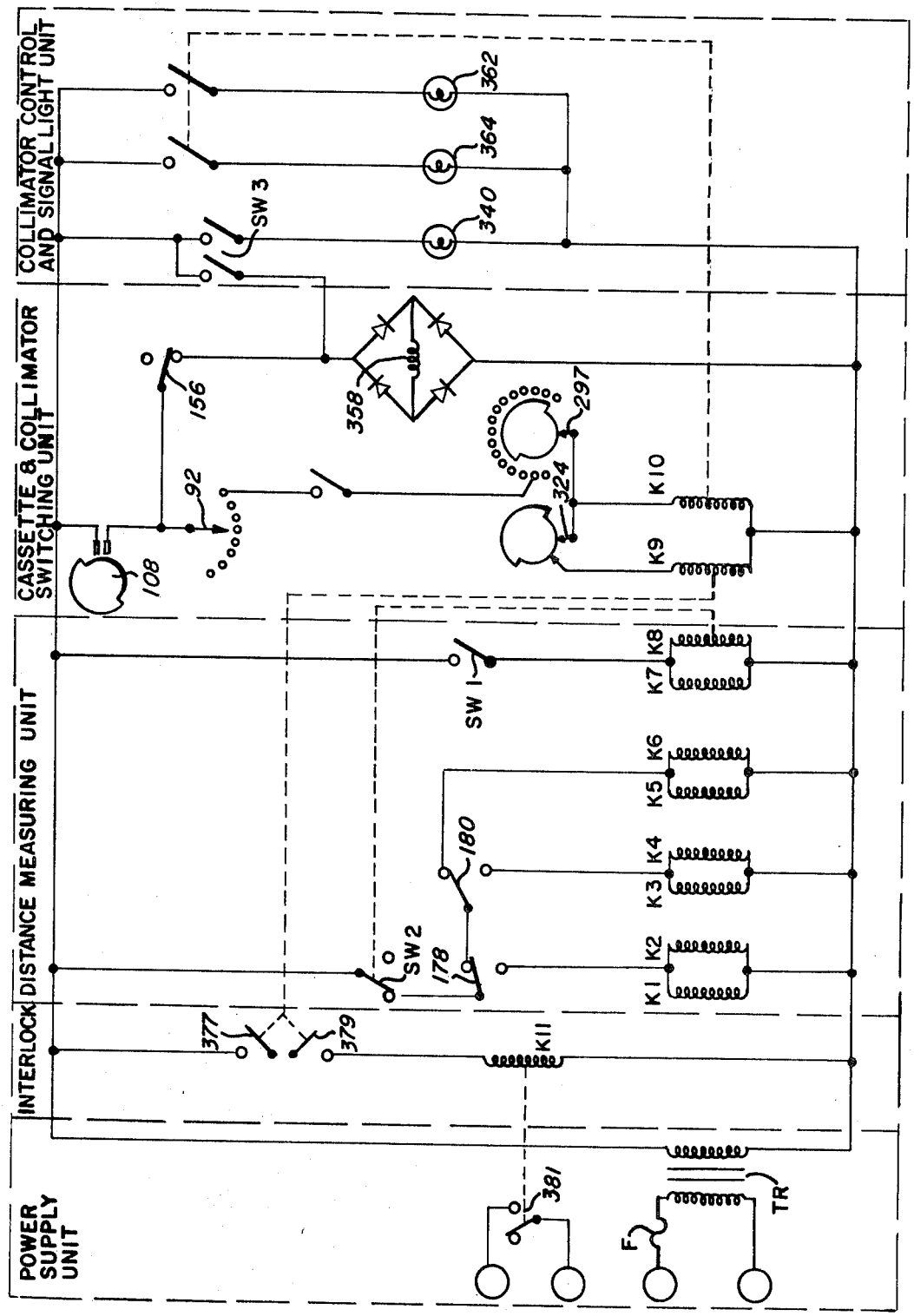
FIG. 22 is a diagram of the electrical circuit employed in the present invention.

Referring to FIG. 22, the schematic circuit diagram shown therein is utilized in only the automatic operation of the apparatus and is separated into five areas, each of which is designated to correspond to the particular area of the system which has been hereinbefore described. For example, the area designated POWER SUPPLY UNIT is shown to contain a transformer TR which may be 25 volts, for example, a line fuse F and an output interlock relay K11, together with terminals by which the system is interconnected with a suitable source of power.

Another area is designated CASSETTE AND COLLIMATOR SWITCHING UNIT. One portion thereof comprises the cassette switching apparatus consisting of the size signal switch 92 and cross-table or cross-tray direction signal switch 156 which are connected to the power supply unit by a multiconductor cable and disconnection plugs. The collimator switching portion of this unit includes the two switches 297 and 324 and the solenoid 358.

The DISTANCE MEASURING UNIT is shown as including the two microswitches 178 and 180 and relays K1, K2, K3, K4, K5 and K6. Another unit is indicated as INTERLOCK, having an isolating relay K11, while the remaining unit is designated COLLIMATOR CONTROL AND SIGNAL LIGHT UNIT.

The distance measuring unit is, of course, responsive to the retractable cable reel illustrated in FIG. 10 which actuates the two microswitches 178 and 180, switches 178 and 180 being actuated when the cable and reel have moved cam 170 to a position corresponding to a distance of 36, 40 or 48 inches between the X-ray generator and the film. Switches 178—180 control the application of power to the signal sorting or path relays K1—K6 such that relays K1 and K2 are powered and actuated when the X-ray generator is moved to a position 36 inches from the film, relays K3 and K4 are powered and actuated when this distance is 40 inches, and relays K5 and K6 are powered and actuated when this distance is 48 inches.

Referring again to the distance measuring unit, it should be noted that an additional switch SW1 is included in the circuit and is used to control relays K7 and K8, which relays are actuated when the X-ray generating unit with the collimator attached is tilted or rotated so that the X-ray beam is directed horizontally toward a vertically mounted cassette such as is used for chest radiography of a patient. Such horizontal use is most often performed at a distance of 72 inches. Contacts of relay K8 (designated SW2) allow only the K7 and K8 relay circuits to function. A switch SW3 in the collimator control unit is a manual switch for intentional selection of small field cross-table operation and actuates the cross-table solenoid. The signal lights 362 and 364 indicate that the collimator shutters have been closed a proper amount for X-ray beam control and are activated by contacts of relays K9 and K10.

In the operation of the device, with all switches and contacts shown in an unactuated position, operation starts with power being supplied to the primary of transformer TR. The X-ray generating unit 20 will be positioned at a selected distance for the particular radiographic technique desired. This may be 36 inches, 40 inches or 48 inches, which would cause switches 178 and 180 to assume a given position. As an example, a 36-inch distance would close switch 178, actuating relays K1 and K2. This causes those relay contacts to complete a selected combination of circuit paths between the cassette signal switch 92 and collimator switch 297. One of these paths is shown in FIG. 22 by the relay contact 375 between switch points.

A certain selected size of film cassette is placed in the cassette tray and the tray is then slid into position, whereupon switch 92 is rotated by the cassette signaling cam 96 to a given position controlled in accordance with the cassette size.

Switch 297 is then rotated by the collimator controls until relay K10 is actuated, turning on the signal light 362. This indicates that suitable collimation has been accomplished in one direction as the circuit is completed to relay K10.

The second collimation control is now rotated, adjusting switch 324 to the required position, closing the circuit to relay K9. This closes the circuit to the second signal light 364. Two series connected relay contacts 378 and 379 of relays K9 and K10 are now closed, completing a circuit to the coil of relay K11. Contacts 381 of relay K11 now close, completing the X-ray exposure interlock circuit, permitting the X-ray exposure to be made.

The same process may be repeated for each cassette size and distance employed. It will be noted that collimator switches 297 and 324 have relatively large rotor blade sections which permit the collimated beam size to be reduced while still maintaining a complete control interlock circuit. The X-ray beam, however, may not be made larger than allowed by cassette size in either direction since to do so would cause the interlock circuit to open and prevent operation of the X-ray generating device.

Cassette cross-table switch 156, being in the normally closed position when no cassette is in the tray, will be actuated when the cassette is inserted in a normal cross-tray direction. This will open the circuit to the solenoid 358 and, thus, no power will be supplied thereto.

If the cassette is inserted in a cross-table position, microswitch 156 will not be attached. Thus, power will be supplied to the solenoid 358 which will mechanically move the collimator switches 297 and 324 so that the dimensions, such as 5×7, are reversed whereupon readjustment of the collimator controls, and consequently of the collimator aperture plates, must be made to acquire a correct field size. The solenoid illustrated herein is designed for DC operation. Therefore, it is shown in FIG. 22 in a bridge rectifier circuit for operation from the AC power source.

From the foregoing, it will be apparent that a novel structure and method have been provided in accordance with the objectives of this invention to insure that an X-ray system may be operated to generate an X-ray beam having a cross-sectional size which is limited to a selected filed size in a given plane, whereby a patient being treated will not be subjected to unnecessary radiation exposure. It will be apparent that many changes may be made by those skilled in the art without departing from the spirit of the invention as expressed in the accompanying claims.

We claim:

1. X-ray apparatus comprising a source of X-radiation for producing a beam of X-rays directed to a film to be irradiated,
   a collimator in spaced relation with said source having an adjustable aperture through which a beam of X-rays passes to said film,
   control means in said collimator for adjusting the size of the aperture and consequently the cross-sectional size of a beam passing through the aperture,
   said control means including means for producing a first electrical signal corresponding to the size of said aperture,
   size sensing means for determining the size of the film to be irradiated and for producing second electrical signals corresponding thereto,
   direction sensing means for separately sensing the cross-tray or cross-table position of the film and for producing third electrical signals corresponding thereto,
   and integrating means for receiving said signals from the size sensing means, the direction sensing means and the control means and for determining the relationship between the size and direction of the film and the cross-sectional size and shape of a beam at said film as controlled by the size of said aperture.

2. X-ray apparatus as set forth in claim 1, said control means is manually operable.

3. X-ray apparatus as set forth in claim 1 wherein said first signal producing means includes switch means and said collimator includes a pair of control shafts, said switch means including a pair of rotary switches connected with the respective control shafts, and integrating means includes a pair of rotary switches each have a rotor and a switch plate, and said control mechanism comprises a cam fixed to each control shaft for rotation therewith, a switch operating shaft connected to both switches, a pair of pinion gears on the switch operating shaft, a pair of drive gears in mesh with respective pinion gears, and driving links between the drive gears and the respective cams, whereby rotation of the cams by the control shafts upon adjustment of the aperture plates will cause rotation of the respective pinion gears, one pinion gear being connected to the rotors of the switches and freely revolvable on the switch operating shaft and the other pinion gear being fixed to the switch operating shaft for adjusting said switchplate.

4. X-ray apparatus as set forth in claim 3 wherein compensation means is provided for adjusting said integrating means when the film is in cross-table position.

5. X-ray apparatus as set forth in claim 4 wherein said compensation means comprises adjustment means operatively connected to said switch means for adjusting said switch means to compensate for cross-table positioning of the film.

6. X-ray apparatus as set forth in claim 5 wherein said compensation means is manually operable.

7. X-ray apparatus as set forth in claim 5 wherein said compensation means is automatically operable.

8. X-ray apparatus as set forth in claim 5 wherein said direction-determining means includes an electrical switch, and said compensation means comprises a solenoid electrically connected to said electrical switch, and linkage is connected between said solenoid and said integrating means for adjusting said integrating means when said solenoid is operated in response to operation of said electrical switch.

9. X-ray apparatus as set forth in claim 1 wherein is provided means for supplying power to said source, and means connected with and responsive to said integrating means for preventing transmission of power to said source when said integrating means determines the cross-sectional size of the beam at said area will not conform to the size of the area.

10. X-ray apparatus as set forth in claim 1 wherein said size sensing means comprises support means for said film, clamping means engageable with opposite sides of said film, cam means connected to said clamping means and adjustable therewith to a position determined by the position of the clamping means, said cam means comprising a disc having a side surface with varying circumferential amplitude, and electrical switch means positioned in engagement with said side surface of the cam means for producing an electrical signal corresponding to the position of the cam means as determined by the adjusted position of the clamping means, and wherein said direction sensing means comprises mechanical linkage connected to said clamping means and includes a feeler member in engagement with said film when said film extends in a first direction and which is out of engagement with the film when the film extends in a direction perpendicular to said first direction, a direction signal switch, and switch operating means connected to said linkage and movable in response thereto for operating said switch when said film extends in one of said directions.